(12) United States Patent
Kesselring (10) Patent No.: US 8,586,901 B2
(45) Date of Patent: Nov. 19, 2013

(54) METHOD FOR COMPENSATING FOR BORESIGHT ERROR IN MISSILES WITH COMPOSITE RADOMES AND GUIDANCE SECTION WITH BORESIGHT ERROR COMPENSATION

(75) Inventor: Robert L. Kesselring, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 442 days.

(21) Appl. No.: 12/869,496

(22) Filed: Aug. 26, 2010

(65) Prior Publication Data

US 2012/0153071 A1 Jun. 21, 2012

(51) Int. Cl.
  H01Q 1/42 (2006.01)
  F41G 7/22 (2006.01)
  G01S 7/40 (2006.01)
  H01Q 1/00 (2006.01)
  F41G 7/00 (2006.01)
  G01S 7/00 (2006.01)

(52) U.S. Cl.
  USPC .......... 244/3.19; 244/3.1; 244/3.15; 343/872; 342/61; 342/62; 342/165; 342/173; 342/175; 342/195

(58) Field of Classification Search
  USPC ............ 244/3.1, 3.15, 3.19; 343/872, 873; 342/61, 62, 63, 104–115, 118, 134, 342/139, 141, 165, 173–175, 192–197
  See application file for complete search history.

(56) References Cited

U.S. PATENT DOCUMENTS 3,063,654 A * 11/1962 Youngren et al. ............. 343/872
3,128,466 A *  4/1964 Brown et al. ................. 343/872
3,316,549 A *  4/1967 Hallendorff .................. 343/872
3,794,998 A *  2/1974 Pearson et al. ............... 342/195
3,940,767 A *  2/1976 DeLano et al. ............... 343/872
4,091,388 A *  5/1978 Fiscus .......................... 343/872
4,303,211 A * 12/1981 Dooley et al. ................ 244/3.19
5,149,011 A     9/1992 Gratt et al.
5,960,097 A     9/1999 Pfeiffer et al.
6,181,288 B1 *  1/2001 Ivanov et al. ................. 343/872
6,275,182 B1 *  8/2001 Meierbachtol ............... 342/174
6,845,938 B2    1/2005 Muravez
6,946,990 B2 *  9/2005 Monk ........................... 342/174
7,218,272 B2 *  5/2007 Steinbauer ..................... 342/62

OTHER PUBLICATIONS

"International Application Serial No. PCT/US2011/01144, International Search Report mailed May 18, 2012", 4 pgs.
"International Application Serial No. PCT/US2011/01144, Invitation to Pay Addtional Fees mailed Mar. 9, 2012", 2 pgs.
"International Application Serial No. PCT/US2011/01144, Written Opinion mailed May 18, 2012", 5 pgs.
"International Application Serial No. PCT/US2011/001144, International Preliminary Report on Patentability mailed Mar. 7, 2013", 7 pgs.

* cited by examiner

Primary Examiner — Bernarr Gregory
(74) Attorney, Agent, or Firm — Schwegman Lundberg & Woessner, P.A.

(57) ABSTRACT

Embodiments of a guidance section that compensates for boresight error (BSE) caused by effects of a composite radome. The guidance section includes a BSE compensation element to add high-pass filtered noise to compensated BSE data. The guidance section also includes and a Kalman filter to generate line-of-sight rate (LOSR) BSE noise from the compensated BSE data and the added high-pass filtered noise. In some embodiments, a method for generating a revised BSE correction matrix is provided. The revised BSE correction matrix may compensate for BSE caused by effects in the composite radome and may correct for relative target velocity error.

17 Claims, 7 Drawing Sheets

METHOD FOR COMPENSATING FOR BORESIGHT ERROR IN MISSILES WITH COMPOSITE RADOMES AND GUIDANCE SECTION WITH BORESIGHT ERROR COMPENSATION

GOVERNMENT RIGHTS

This invention was made with United States Government support under Contract Number N0024-07-C-5431. The United States Government has certain rights in this invention.

TECHNICAL FIELD

Embodiments pertain to missiles and compensating for boresight error (BSE) due to the effects of a radome.

BACKGROUND

Guidance sections employing a conventional null-seeker design employ a rate-control loop to maintain the target at the center of the radar antenna gimbal axis (the boresight). The boresight error (BSE) is a position error that represents the difference between the perceived target position and the true target position. The guidance section is conventionally configured to correct for the BSE to increase the probability of guidance (Pg) that a missile may achieve for various threat and trajectory scenarios. The configuration may be optimized to maintain an optimum guidance loop bandwidth and BSE is the independent variable. One difficulty is the creation of BSE correction factors related to manufacturing test data with tactical performance to achieve a tactical configuration of optimum guidance loop bandwidth to sustain an optimum Pg.

There are three dominant issues related to radome errors that may significantly affect the Pg. The refraction properties of the radome may produce noise that is added to a guidance control signal within the guidance control loop. One issue that degrades the Pg is the increased error in estimating a target's instantaneous position. A second issue that degrades the Pg is the mean and variance of the noise that adaptive filters of the guidance loop attenuate as these independent variables determine the adaptive filter bandwidth. A third issue is that the radome refracts the incoming radar signals within the field-of-regard (FOR) of the radome. A target random walk within the FOR produces a sample subset of the random noise within the entire FOR. This subset may be a non-probability sample (i.e., not having the same mean and variance as the entire FOR error set).

Noise within the target velocity bandwidth of the guidance control loop is retained by the guidance loop as it is provided a feedback path (e.g., through by missile body motion coupling). These retained errors may induce undesirable trajectory changes in the flight path resulting in lost energy and thus diminishing the Pg.

Radome refraction errors may be characterized as a topographical error surface associated with the FOR position. A corresponding BSE correction table may be used to reduce instantaneous position errors. The spatial resolution within the FOR of the error correction table may determine a smoothing function of the measured error. The correction of errors between entries in the table is conventionally achieved by estimation using linear interpolation to estimate the amount of BSE between table entries. These conventional correction tables are created with the at least three assumptions linked to the three issues described previously and a fourth assumption related to standard signal processing algorithms. The first assumption is that the residual error (noise) that is outside the target signal bandwidth will be attenuated by the guidance system noise filters. The second assumption is that all noise will have a Gaussian or broadband mean and variance. The third assumption is that the random walk of the target within the FOR will generate noise that is a true subset of all noise within the FOR. The fourth assumption is that given the measured error surface representing the error within the FOR is dominated by a sinusoidal bias along a radial vector from bore-sight, it is reasonable to use the Fast Fourier Transform to generate a noise power spectral density plot that relates power to the spatial wavelength of the bias. These assumptions may require a special solution dependent upon materials and manufacturing processes, not an independent solution derived from the implementation factors that can prescribe the system performance requirements.

One tactical factor associated with conventional correction tables is the addition of bias which results in a non-monotonic correction function. This nonlinearity compounded with the assumptions taken significantly impacts the statistics of the residual noise. This may change the mean and variance of the tactical noise subset resulting in a degraded Pg.

These conventional correction tables further depend on the material and manufacturing processes which generally conforms to pyroceramic radomes. These conventional correction tables are generally not suitable for use with composite radomes because the change in materials and processes may significantly impact the statistics of the refraction-induced noise. Consequently the difference between a tactical noise Probability Density Function (PDF) and the FOR PDF may be large enough to increase the error in estimation of the instantaneous target position because of the reduced bandwidth of the adaptive filter in response to the noise variance for which a conventional correction table does not account.

Thus, there are general needs for improved methods for compensating for BSE in missiles, particularly for missiles that use composite radomes. There are also general needs for guidance sections with improved BSE compensation.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
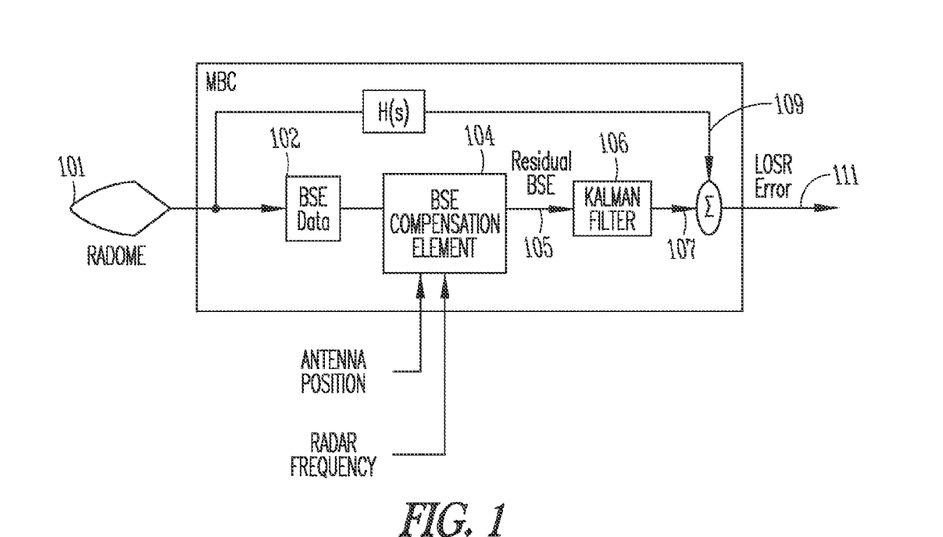
FIG. 1 is a functional diagram of a portion of a guidance section in accordance with some embodiments.

FIG. 1 is a functional diagram of a portion of a guidance section in accordance with some embodiments. Guidance section 100 may include, among other things, a BSE compensation element 104 that may be configured to compensate for relative target position error (i.e., the BSE) that may be caused by effects and flaws (e.g., refraction, diffraction, and distortion) of a radome 101 so that the true position (vs. the perceived position) of a target can be determined in the field of regard. In some embodiments, the BSE compensation element 104 may also compensate for the relative target velocity error (i.e., the first derivative of the BSE, referred to as BSE slope (BSES)). In some embodiments, BSE compensation element 104 may also compensate for the relative target acceleration error (i.e., the second derivate of the BSE, referred to as BSES slope (BSESS)). The output of the guidance section 100 is the first derivative of the target position with respect to time, referred to as the line-of-sight rate (LOSR), and may be provided for both the horizontal axis and vertical axis.

In some embodiments, the radome 101 may be a composite radome (i.e., fiberglass), rather than a more conventional pyroceramic radome. The BSE compensation element 104 may compensate for the effects of the BSE caused by a composite radome. In these embodiments, the BSE compensation element 104 may add high-pass filtered noise 105 to compensated BSE data 102. The guidance section 100 may also include a Kalman filter 106 to generate LOSR BSE noise 107 from the compensated BSE data 102 that is provided by the BSE compensation element 104. In addition to the high-pass filtered noise 105, the BSE compensation element 104 may also add a controlled bias to the input of the Kalman filter 106. The added bias may be a DC bias that tailors the system bandwidth based on the geometric topology of the look-ahead window. The operation of the BSE compensation element 104 as well as generation of the compensated BSE data 102 is described in more detail below.

As illustrated in FIG. 1, the guidance section 100 generates an LOSR error signal output 111 by summing the LOSR BSE noise 107 with processed signal 109. The LOSR error signal output 111 may be used by a missile's guidance computer to modify the trajectory of the missile.

Figure 2:
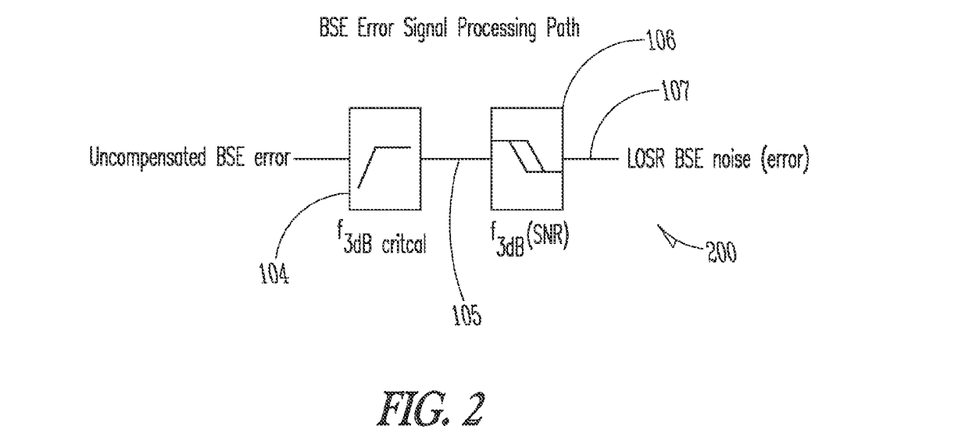
FIG. 2 illustrates a portion of a BSE signal processing path in accordance with some embodiments.

FIG. 2 illustrates a portion of a BSE error signal processing path 200 in accordance with some embodiments. The BSE error signal processing path 200 includes the BSE compensation element 104 of FIG. 1 and the Kalman filter 106 of FIG. 1. As illustrated in FIG. 2, the Kalman filter 106 is provided in the signal processing path 200 after the BSE compensation element 104. The BSE compensation element 104 performs a high-pass filtering operation, among other things, to add high-pass filtered noise 105 to the compensated BSE data 102 (FIG. 1). This may cause the Kalman filter 106 to generate an error signal (i.e., LOSR BSE noise 107).

In some embodiments, the BSE compensation element 104 comprises a high-pass filter to perform two-dimensional spatial filtering on the added to provide a predetermine power spectral density (PSD). The two-dimensions may comprise orthogonal directions, such as x and y directions or pitch and yaw directions.

In some embodiments, the addition of the high-pass filtering by the BSE compensation element 104 may improve an estimation of target velocity. In these embodiments, an initial BSE correction matrix may be provided with a radome to correct for position errors (i.e., the BSE). As described in more detail below, compensated BSE matrices may be generated by iteratively operating on the initial BSE data to compute errors in velocity (i.e., BSES errors). Accordingly, the compensated BSE matrices may be used to correct for flaws in the radome that affect target velocity. In some further embodiments, compensated BSE matrices are generated by iteratively operating on the initial BSE data to compute errors in acceleration (i.e., BSESS errors).

Figure 3:
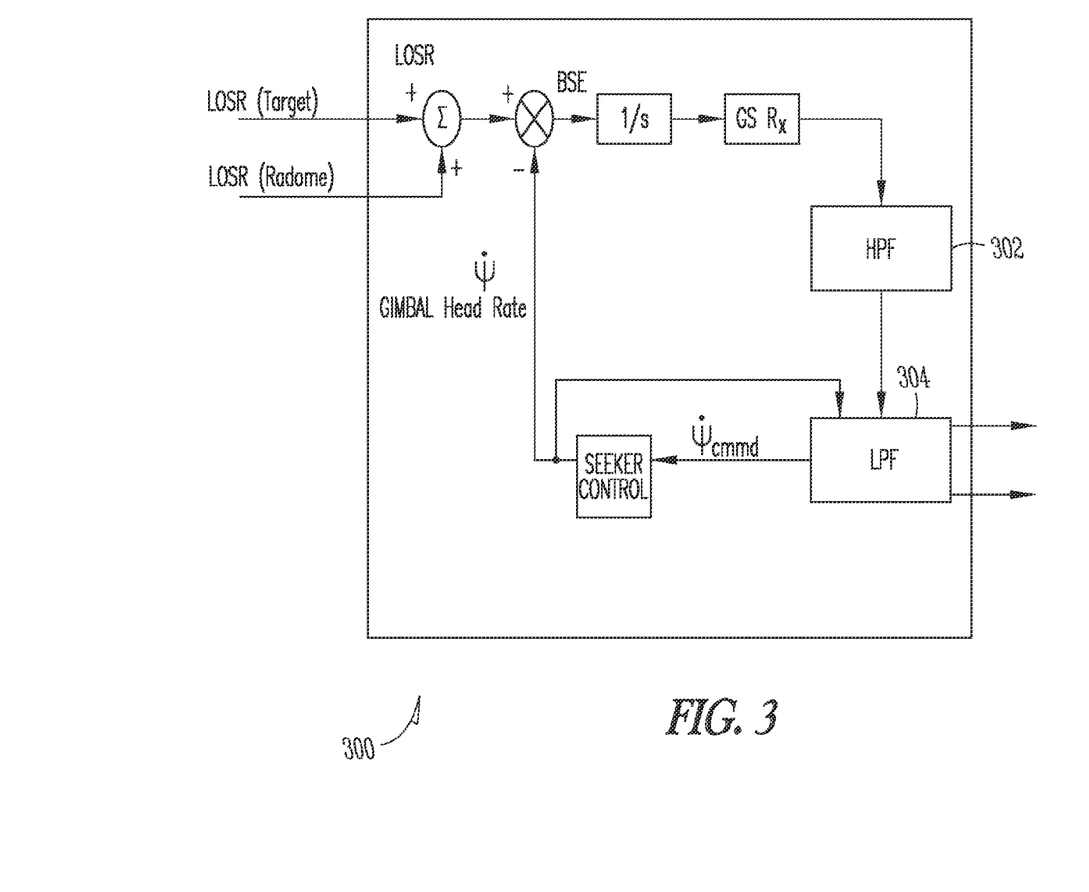
FIG. 3 illustrates the generation of compensated BSE matrices in accordance with some embodiments.

FIG. 3 illustrates the generation of compensated BSE matrices in accordance with some embodiments. System 300 may be one of two systems used to generate a compensated BSE matrix for each orthogonal axis or direction. The compensated BSE matrices may be used in the guidance system 100 (FIG. 1) as compensated BSE data 102 (FIG. 1).

Among other things, system 300 may include a high-pass filter (HPF) 302 to reduce target-velocity noise, and low-pass filter (LPF) 302 (e.g., a Kalman filter) to reduce non-uniform noise. These embodiments are discussed in more detail below.

Figure 4:
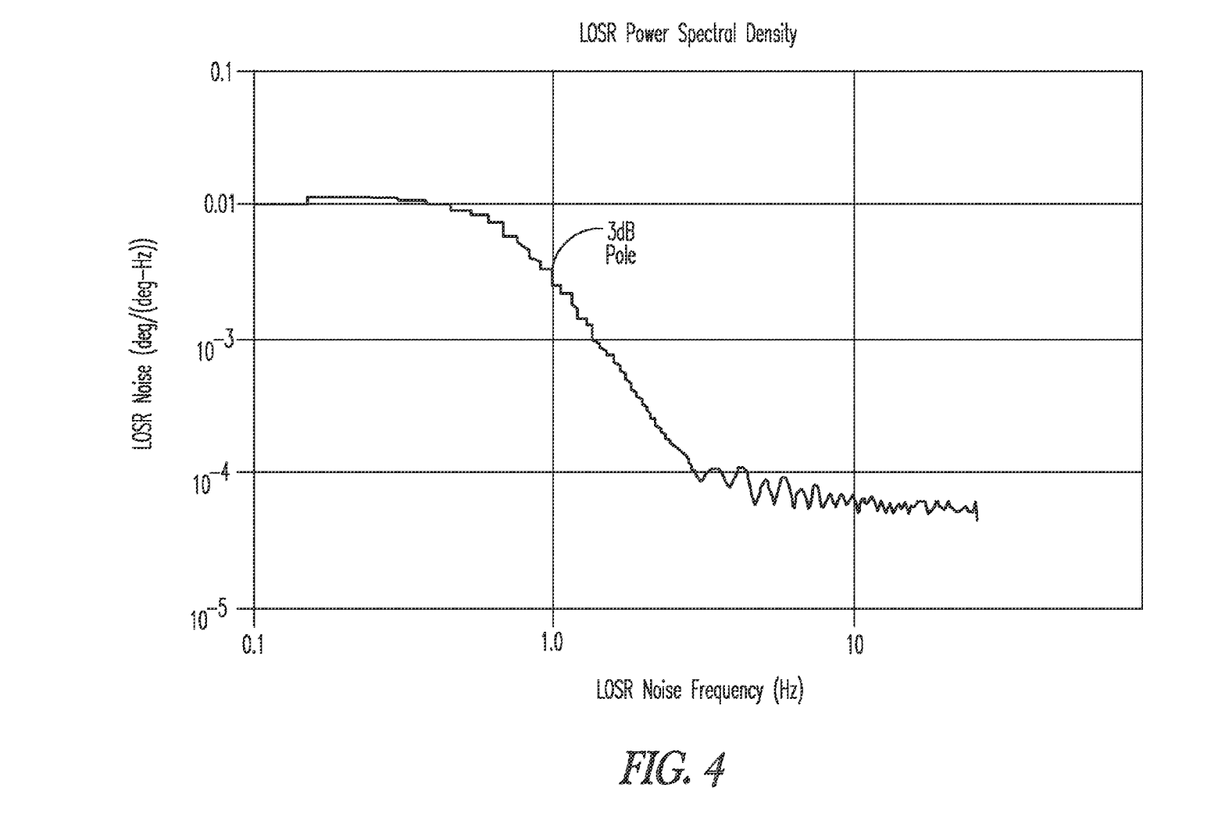
FIG. 4 illustrates a spectral plot of noise present in an estimated velocity signal in accordance with some embodiments.

FIG. 4 illustrates a spectral plot of noise present in an estimated velocity signal in accordance with some embodiments. The spectral plot of FIG. 4 illustrates an example test case selected for some particular boundary conditions and may be used to establish tactical noise characteristics. The aperture size for use in generating the compensated BSE matrices may be selected based on a 3-dB pole of the tactical allowed noise PSD, as well as system requirements and a relative target velocity. Accordingly, the residual BSES noise from the radome may be within one of two frequency bands. The boundary between unattenuable noise within the target velocity bandwidth and an attenuable refraction noise bandwidth may be at the frequency of the 3 dB pole of the velocity noise PSD. The selection of this pole may help optimize the guidance loop bandwidth by optimizing the estimated target velocity signal-to-noise ratio (SNR).

To help insure that this pole is maintained by the Kalman filter, the mean and variance of the tactical refraction noise may be configured not to exceed a specified power level (i.e., the mean and variance for both bandwidths). Therefore refraction-induced target velocity noise may be filtered out by the HPF 302 (FIG. 3). Noise that remains may be eliminated by the Kalman filter 304 (FIG. 3) leaving residual noise, which may be statistically broadband or Gaussian for the regions of apertures smaller than a critical aperture. The specified noise power, mean and variance may be achieved in a tactical scenario to help insure optimum filter bandwidth to help sustain optimum Pg performance.

Figure 5:
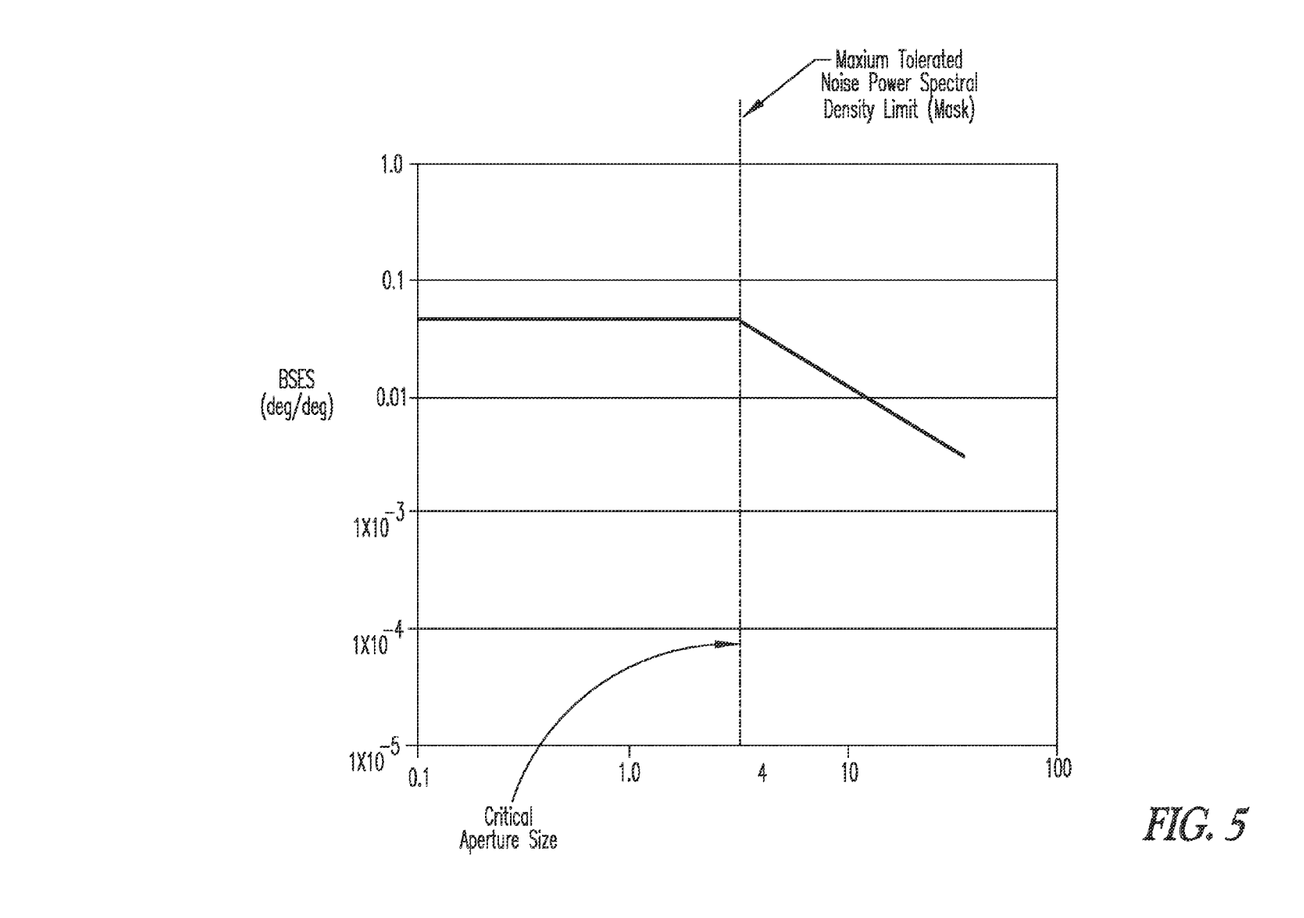
FIG. 5 illustrates aperture size selection in accordance with some embodiments.

FIG. 5 illustrates aperture size selection in accordance with some embodiments. To determine the aperture size, a six-degrees-of-freedom (6-DOF) simulation of flight with a flawless radome may be performed and the line-of-sight velocity output for both vertical and horizontal axis may be captured. This simulation may be used to determine the maximum allowed noise. Flight trajectories are used that place the target within the inner half of the field of regard. A broadband noise of limited bandwidth may be generated and the BSE compensation table is populated with this noise. The simulations may be rerun again and the magnitude of the BSE compensation noise may be increased using scalar multiplication. A binary search may then be used to determine the maximum broadband noise that follows BSE compensation that the system can tolerate to reproduce the results achieved above. The amount of noise that the Kalman filter 106 (FIG. 1) can accommodate is determined to optimize the closed loop bandwidth of the system. A power spectral density plot may be computed in the spatial domain of the BSE compensation noise that produced the results which becomes the maximum BSE power spectral density. This may represent the performance criteria for the filter used to create the revised BSE compensation matrices.

As illustrated in FIG. 5, the power-spectral density (PSD) should have a slope similar to that of the noise above to provide a spectral mask to be applied to the actual spatial noise. In some embodiments, two-dimensional spatial filtering of the uncompensated BSE may be performed with an infinite impulse response (IIR) filter with one or more poles at the critical aperture size. The selected critical aperture size may be the 3 dB pole of the allowed noise PSD as shown in FIG. 4.

Figure 6A:
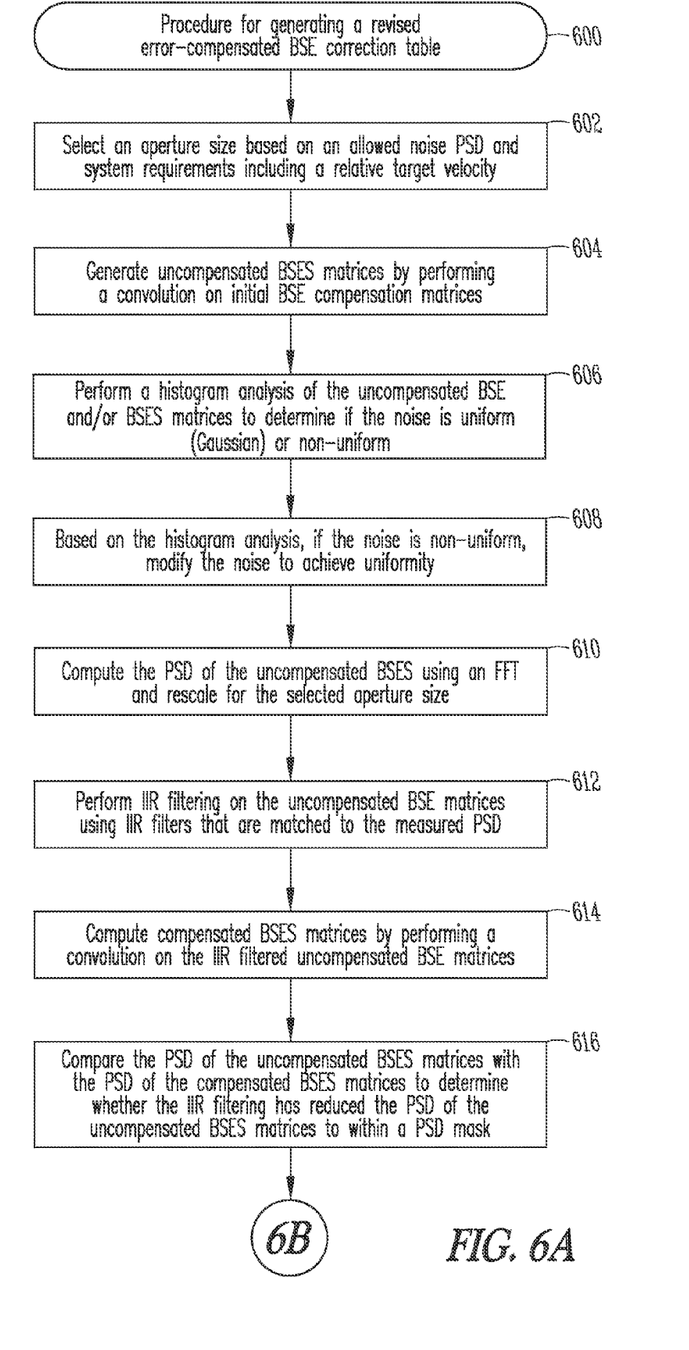
FIGS. 6A and 6B illustrate a procedure for generating a revised error-compensated BSE correction table in accordance with some embodiments.
Figure 6B:
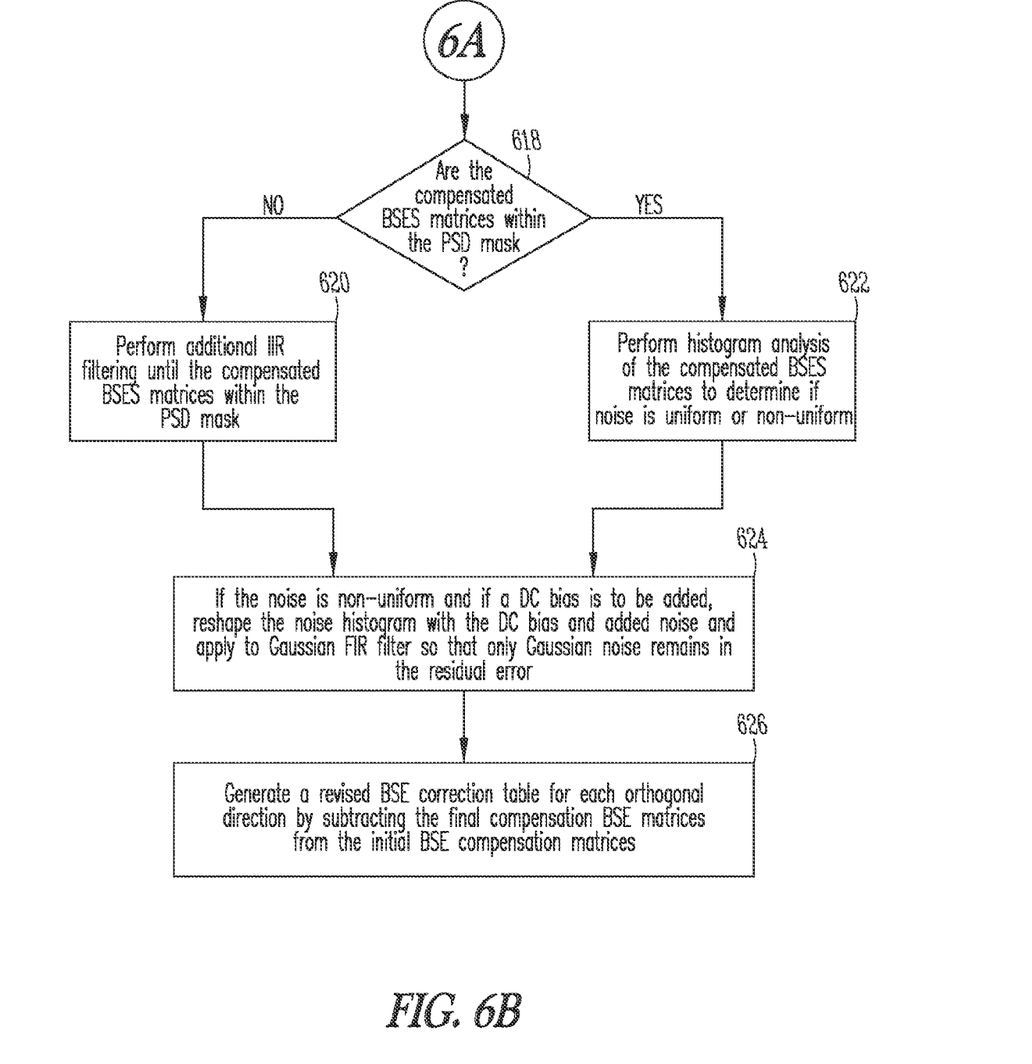

FIGS. 6A and 6B illustrate a procedure for generating a revised error-compensated BSE correction table in accordance with some embodiments. The revised error-compensated BSE correction table generated by procedure 600 may be used as the compensated BSE data 102 (FIG. 1).

In operation 602, an aperture size is selected based on an allowed noise PSD and system requirements including a relative target velocity. In some embodiments, the aperture size may be derived from a 6-DOF scenario (discussed above) based simulation of missile performance with no radome that insures maximum desired probability of guidance.

In operation 604, uncompensated BSES matrices are generated by performing a convolution on the initial BSE compensation matrices. The initial BSE compensation matrices may have been generated for a specific radome (e.g., by the radome manufacturer) to characterize the radome. In some embodiments, one set of matrices may be provided for each orthogonal direction (e.g., vertical and horizontal) per operating frequency. In an example embodiment that uses nine different frequencies, the initial BSE compensation matrices may comprise eighteen matrices. The initial BSE compensation matrices may have been generated for each location on the radome and measured by a ray-trace technique.

In operation 606, a histogram analysis of the uncompensated BSE matrices is performed to determine if the noise is uniform (Gaussian) or non-uniform. In some embodiments, a histogram analysis of the uncompensated BSES matrices may also be performed to further help determine if the noise is uniform (Gaussian) or non-uniform. In some embodiments, the histogram analysis of the uncompensated BSES matrices may be performed instead of the histogram analysis of the uncompensated BSE matrices.

In operation 608, the noise in the uncompensated BSE and BSES matrices may be modified to achieve uniformity if the noise is non-uniform based on the histogram analysis of operation 606.

In operation 610, the PSD of the uncompensated BSES may be computed using a fast-Fourier transform (FFT). The PSD may then be rescaled for the selected aperture size. An aperture may be defined as a half-wavelength.

In operation 612, IIR filtering may be performed on the uncompensated BSE matrices using IIR filters that are matched to the measured PSD. In some embodiments, a unique IIR filter may be designed for each frequency depending on the radome, although this is not a requirement.

In operation 614, compensated BSES matrices may be computed by performing a convolution on the IIR filtered uncompensated BSE matrices.

In operation 616, the PSD of the uncompensated BSES matrices generated in operation 610 are compared with the PSD of the compensated BSES matrices generated in step 614 to determine whether the IIR filtering has reduced the PSD of the uncompensated BSES matrices to within a PSD mask.

Operation 618 determines if the compensated BSES matrices are within the PSD mask. When the compensated BSES matrices are not within the PSD mask, operation 620 is performed. When the compensated BSES matrices are within the PSD mask, operation 622 is performed.

In operation 620, additional IIR filtering may be performed until the compensated BSES matrices within the PSD mask.

In operation 622, a histogram analysis of the compensated BSES matrices is performed to determine if noise is uniform or non-uniform.

In operation 624, if the noise is non-uniform and if a DC bias is to be added, the noise histogram may be reshaped with the DC bias and added noise and a Gaussian FIR filter may be applied so that only Gaussian noise remains in the residual error. In this way, only Gaussian noise remains in the residual error for use in generating the final compensated BSE matrices.

In operation 626, a revised BSE correction table may be generated by subtracting the final compensated BSE matrices from the initial BSE compensation matrices. Operation 626 may include generating a revised BSE correction table for each orthogonal direction and for each frequency.

In some embodiments, the data supplied for the radome (i.e., the uncompensated BSE matrices) may be sampled at many RF frequencies, and the error may be split into orthogonal matrices. The data to be processed may vary significantly for between radomes. Each radome may have been handmade and may have its own anomalies to correct for. Procedure 600 may therefore be applied to every BSE compensation matrix. In some embodiments, the IIR and HPF filters may be tailored for each significant group of data, however but more than one design of the filter may be used in order to keep the noise characteristics at the histogram and power level obtained by the simulation. The noise may vary by assumed flight environmental conditions so they may be judiciously selected to have significant performance dependency on the radome errors. Preprocessing with filters of the uncompensated BSE data may be performed in order to reduce the amount of processing in by the tactical software. If the uncompensated BSE data is 'well behaved', the filtering is reducible to the HPF case where the filter dimension is selected to be the critical aperture size correlating with the 3 dB pole of the line-of-sight output noise power spectrum.

Figure 7:
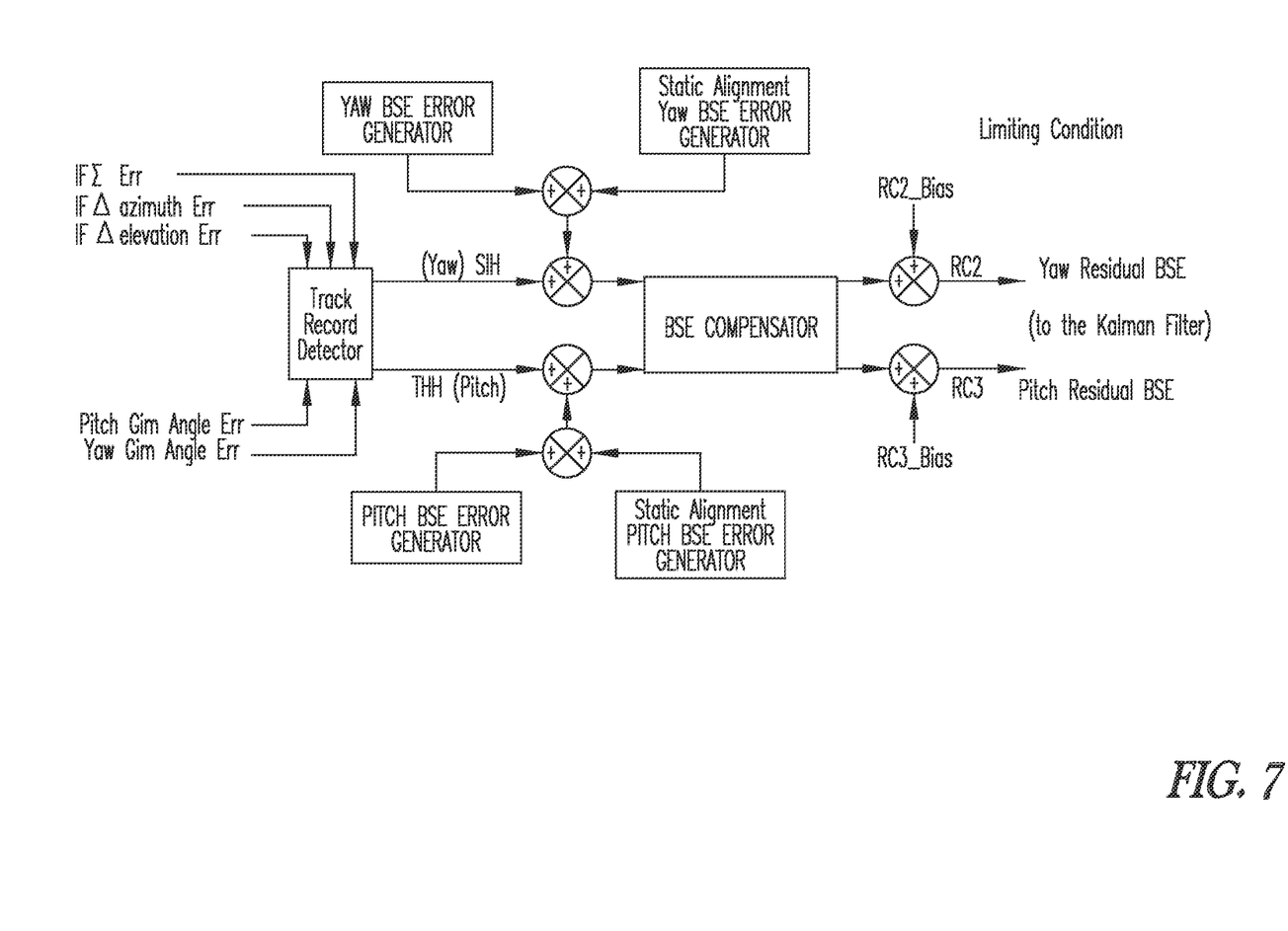
FIG. 7 is a compensation analysis diagram in accordance with some embodiments.

FIG. 7 is a compensation analysis diagram in accordance with some embodiments. As illustrated in FIG. 7, a residual BSE for both orthogonal directions (yaw and pitch) may be generated based on the revised BSE compensation and in some embodiments, added bias (shown for both yaw and pitch). As illustrated, the residual BSE may be provided to the Kalman filter. The revised BSE compensation may be provided in the form of a look-up-table (LUT), which may comprise the revised BSE correction matrices for the particular radome.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A guidance section configured to compensate for boresight error (BSE) caused by effects of a radome, the guidance section comprising:

a BSE compensation element to add high-pass filtered noise to pre-compensated BSE data, the pre-compensated BSE data being previously corrected for relative target velocity error; and a Kalman filter to generate line-of-sight rate (LOSR) BSE noise from the pre-compensated BSE data and the added high-pass filtered noise.

2. The guidance section of claim 1 wherein the BSE compensation element comprises a high-pass filter to perform two-dimensional spatial filtering on the added high-pass filtered noise to provide a predetermine power spectral density (PSD).

3. The guidance section of claim 2 wherein the BSE compensation element is further configured to add a bias to the pre-compensated BSE data with the added high-pass filtered noise, the bias being added in a signal processing path prior to the Kalman filter.

4. The guidance section of claim 3 wherein the pre-compensated BSE data is generated by performing an iterative error-compensating BSE correction procedure on initial BSE compensation data to correct for the relative target velocity error.

5. The guidance section of claim 4 wherein the pre-compensated BSE data is provided in a look-up-table.

6. The guidance section of claim 5 wherein the Kalman filter is provided in a signal processing path after the BSE compensation element.

7. The guidance section of claim 6 wherein the guidance section is configured for use in a missile, and
wherein the LOSR BSE noise is used by the guidance section for trajectory modification.

8. The guidance section of claim 4 wherein the pre-compensated BSE data is configured to further compensate for relative target acceleration error.

9. A method performed by a guidance section to compensate for boresight error (BSE) caused by effects of a radome, the method comprising:
adding high-pass filtered noise to pre-compensated BSE data, the pre-compensated BSE data being previously corrected for relative target velocity error; and
generating line-of-sight rate (LOSR) BSE noise with a Kalman filter from the pre-compensated BSE data and the added high-pass filtered noise; and
using the LOSR BSE noise to modify trajectory.

10. The method of claim 9 further comprising adding a bias to the pre-compensated BSE data with the added high-pass filtered noise, the bias being added in a signal processing path prior to the Kalman filter.

11. The method of claim 9 wherein the pre compensated BSE data is generated by performing an iterative error-compensating BSE correction procedure on initial BSE compensation data to correct for the relative target velocity error.

12. A method performed by one or more processing elements for generating revised boresight error (BSE) compensation matrices from initial BSE compensation matrices, the revised BSE compensation matrices for use by a guidance section of a missile to compensate for BSE caused by effects of a radome and relative target velocity error,
wherein the method comprises:
selecting an aperture size based on an allowed noise power-spectral density (PSD) and a relative target velocity; and
iteratively infinite impulse response (IIR) filtering the initial BSE compensation matrices to generate updated BSE matrices until a PSD of the updated BSE matrices are within a PSD mask,
wherein the PSD is scaled based on the selected aperture size, and
wherein the updated BSE matrices are used as the revised BSE compensation matrices when the PSD of the updated BSE matrices are within a PSD mask.

13. The method of claim 12 further comprising:
performing a convolution on the initial BSE compensation matrices to generate uncompensated BSE slope (BSES) matrices; and
measuring a PSD of the uncompensated BSES matrices and rescaling the uncompensated BSES matrices for the selected aperture size,
wherein the IIR filtering of the initial BSE compensation matrices is performed with the IIR filter being matched to the measured PSD of the uncompensated BSES matrices.

14. The method of claim 13 further comprising:
performing a convolution on the IIR filtered initial BSE compensation matrices to generate compensated BSES matrices;
comparing the PSD of the uncompensated BSES matrices with a PSD of the compensated BSES matrices to determine when the PSD of the uncompensated BSES matrices has been reduced to within the spectral mask; and
performing additional IIR filtering until the compensated BSES matrices are within the PSD mask.

15. The method of claim 14 further comprising:
adding a bias to the compensated BSES matrices to reshape a noise histogram; and
filtering the compensated BSES matrices with a Gaussian filter after the addition of the bias to limit noise in the compensated BSES matrices to Gaussian noise.

16. The method of claim 12 wherein the initial BSE correction matrices comprise initial compensation factors for locations on the radome measured by a ray trace technique, and
wherein the revised BSE correction matrices are configured to for use in the guidance section to compensate for relative target velocity error.

17. The method of claim 16 wherein the guidance section comprises a BSE compensation element to add high-pass filtered noise to the revised BSE correction matrices in a signal processing path prior to a Kalman filter, wherein the Kalman filter is configured to generate line-of-sight rate (LOSR) BSE noise from the compensated BSE data and the added high-pass filtered noise.

* * * * *